April 13, 1926.
W. S. U'REN
1,580,391
GARDEN IMPLEMENT
Filed August 26 1924    2 Sheets-Sheet 1
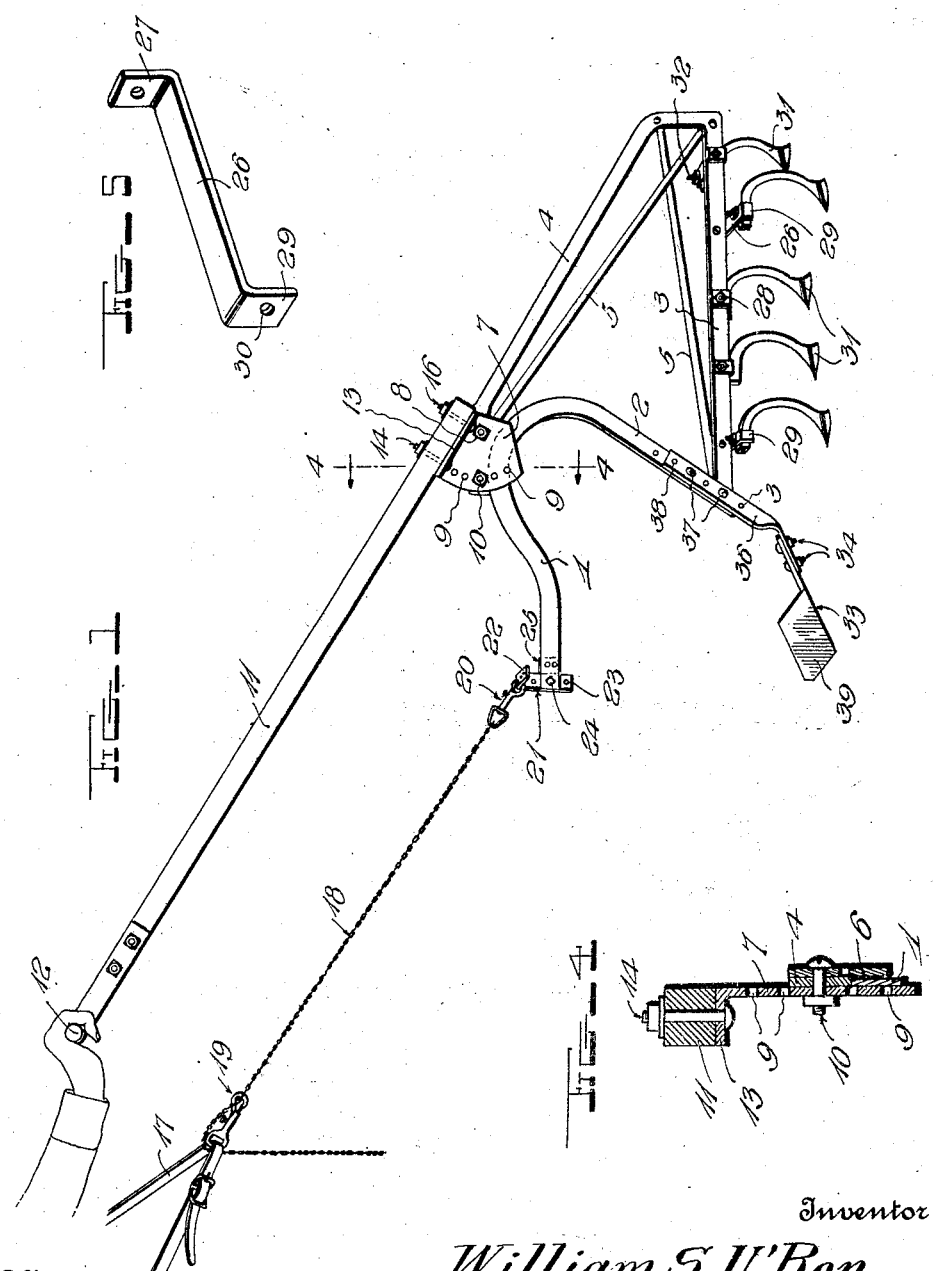
Inventor
William S. U'Ren
By H. R. Willson &co
Attorneys
Witness

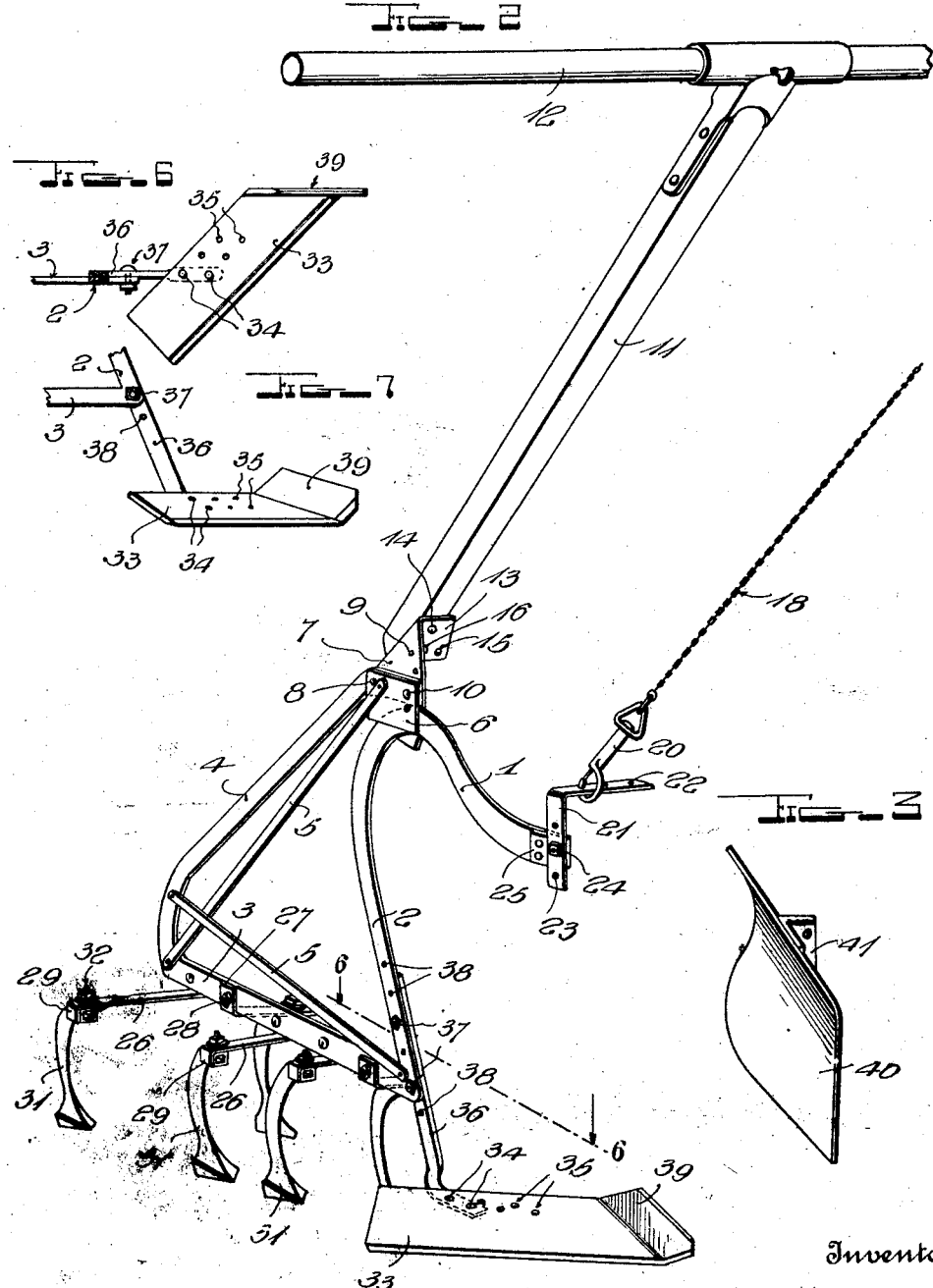

Patented Apr. 13, 1926.

1,580,391

UNITED STATES PATENT OFFICE.

WILLIAM S. U'REN, OF PORTLAND, OREGON.

GARDEN IMPLEMENT.

Application filed August 26, 1924. Serial No. 734,261.

*To all whom it may concern:*

Be it known that I, WILLIAM S. U'REN, a citizen of the United States, residing at Portland, in the county of Multnomah and State of Oregon, have invented certain new and useful Improvements in Garden Implements; and I do declare the following to be a full, clear, and exact description of the invention, such as will enable others skilled in the art to which it appertains to make and use the same.

My invention relates to improvements in garden implements of the type which are manually pulled instead of being pushed, and the principal object of the invention is to improve upon the construction disclosed in my U. S. application Serial No. 644,731, providing an implement which may be more universally used.

In carrying out the above end, a further object is to provide novel means for connecting a plurality of cultivator teeth with a single longitudinal frame bar, and a further aim is to also make provision for carrying a weed cutting blade by said bar, in advance of the cultivating teeth, so that the weeds are first cut from the earth and the latter then effectively cultivated.

With the foregoing and minor objects in view, the invention resides in the novel subject matter hereinafter described and claimed, the description being supplemented by the accompanying drawings.

Figure 1 is substantially a side elevation, partly in perspective.

Figure 2 is an enlarged perspective view.

Figure 3 is a perspective view of a plow share which may be connected to the implement frame instead of the weed-cutting blade and the cultivating teeth shown in Figs. 1 and 2.

Figure 4 is a vertical transverse sectional view on line 4—4 of Fig. 1.

Figure 5 is a detail perspective view of one of the carrying arms for the cultivating teeth.

Figure 6 is a horizontal sectional view on the line 6—6 of Figure 2 showing more particularly the relation of the weed cutting blade and the plant guard with respect to the implement carrying bar.

Figure 7 is a true side elevation of parts shown in Fig. 6.

In the drawings above briefly described, the numeral 1 designates a beam having a downturned rear end 2. An implement carrying bar 3, either integral with or otherwise secured to the beam, projects rearwardly from the lower extremity of the downturned beam end 2, and a second bar 4 inclines forwardly from the rear end of the bar 3 to a point over the bend of the beam 1, said bar 4 being either integral with the bar 3 or otherwise secured thereto in a rigid manner. Preferably a pair of crossed braces 5 are provided to hold the downturned beam end 2 and the bars 3 and 4 in substantially rigid relation with each other. Secured to one side of the bar 4 and lapping onto the corresponding side of the beam 1, is a vertical plate 6, while at the opposite side of said beam and bar, a second vertical plate 7 is disposed, said plate 7 being connected at one end with the bar 4, by a horizontal pivot 8, while its other end is formed with a plurality of spaced bolt-holes 9, disposed on an arc. A clamping bolt 10 passes through the bar 4 and plate 6 and is receivable in any of the openings 8, so that the plate 7 may be vertically adjusted about the pivot 8 to change the inclination of a longitudinal handle 11 which is secured to and extends forwardly from said plate, said handle having an appropriate transverse bar 12 at its front end to be gripped by the user's hands. In the construction shown, the upper edge of the plate 7 is provided with a lateral flange 13 upon which the handle 11 is pivoted as indicated at 14 for horizontal adjustment, one end of the flange 13 having a plurality of spaced bolt holes 15, any one of which may receive a clamping bolt 16 passing through the handle. Thus, this handle may be swung to the most advantageous angular relation, with respect to the frame of the machine.

At 17, a portion of a harness has been shown which is adapted for passage around the user's shoulders, back or hips, and connected to this harness, is a draft chain 18, the connection between said chain and harness being preferably adjustable by means of a snap hook 19. A similar but swiveled snap hook 20 is provided to connect the chain 18 with an inverted L-shaped hitch 21. The horizontal arm of this hitch is formed with spaced openings 22, with any of which the snap 20 may be engaged, while the vertical portion of said hitch is provided with other spaced openings 23, any of which may receive an attaching bolt 24 by means of which the hitch is connected with the front end of the beam 1. This beam is provided with a suitable abutment plate 25 against which the vertical arm of the hitch abuts, so as to hold the latter against pivotal action about the bolt 24.

A plurality of lateral arms 26, of unequal lengths project from the implement carrying bar 3 and are provided with vertically bent inner ends 27 which are detachably bolted at 28 to said bar. At their outer ends, the arms 26 are bent downwardly as at 29 and are formed with bolt holes 30 adjacent these downwardly bent portions. The shanks of a plurality of cultivating teeth 31 are secured to the arms 26 by bolts 32 passing through the bolt holes 30, and said shanks abut the terminals 29 of the arms 26 so that they are held against pivotal action about said bolts. The arms 26 extend oppositely from the bar 3 and as above stated they are of different lengths, so that the teeth will not track each other.

The arms 26 and teeth 31 may be removed whenever desired, but when they are used, I preferably employ also, an oblique, inclined, weed cutting blade 33 which is adjustably secured, by bolts 34 engageable with openings 35, to the lower end of a standard 36. This standard is adjustably secured to the downturned beam end 2, by bolts 37 engageable with spaced bolt holes 38. Preferably, one end of the blade 33 is upwardly bent as indicated at 39 so that it will be visible above the surface of the ground when the blade is operating beneath the surface, thereby at all times indicating to the operator the exact position of the blade, so that there is no danger of cutting the row of plants being cultivated, weeded or both. Attention may be here further directed to the fact that the plant guard 39 has its upper end extended forwardly beyond the front cutting edge of the blade 33, and the front cutting edge of this guard inclines forwardly from said cutting edge of the blade. This guard is truly parallel with the implement carrying bar 3 and with the line of draft of the machine. The blade 33 however is disposed at an angle of from seventy-five to ninety degrees with respect to the bar 3 and the line of draft, and the blade is pitched or forwardly declined at about fifteen degrees to the horizontal. The angular disposition of the blade causes it to exert a shearing rather than a crushing cut upon the weed roots and the inclination of the blade raises the earth and permits it to fall over the upper edge of said blade, tending to break it loose from the weeds. The projecting upper corner of the guard 39 being in advance of the cutting edge of the plate 33, prevents earth from being thrown laterally by the blade, onto the row of plants, permitting weeding of the latter without danger of covering them with earth even when they have just started from the ground.

In Fig. 3, I have shown a plow share 40 having an appropriate attaching bracket 41. When the cultivator teeth are detached from the frame and the standard 36 is also removed, this plow share may be bolted to the downturned end 2 of the beam 1.

The device constructed as shown and described has proved very desirable and efficient in actual use and as these results have been obtained from such structure, it is preferably followed. However, within the scope of the invention as claimed, numerous modifications may be made.

It may be well to add that when operating the implement, the operator faces such implement but moves rearwardly, all pull necessary, being exerted by the harness 17, chain 18, etc., while the handle 11 is used for steering purposes and to control the depth of cut as well as to effectively steady the entire implement.

I claim:—

1. In an implement, a frame comprising a beam having means at its front end for connection with a manually pulled draft device, said beam being provided with a downturned rear end, an implement-carrying bar joined to said downturned end of the beam and extending rearwardly therefrom, and a second bar extending upwardly and forwardly from the rear end of said implement-carrying bar to a point adjacent the beam; and a rigid longitudinal handle secured to the frame and inclined forwardly therefrom.

2. In an implement, a frame comprising a beam having means at its front end for connection with a manually pulled draft device, said beam being provided with a downturned rear end, a bar joined to the downturned end of said beam and projecting rearwardly, and lateral arms projecting oppositely from said bar to carry cultivating teeth; and a rigid longitudinal handle secured to the frame and inclined forwardly therefrom.

3. In an implement, a frame comprising a beam having means at its front end for connection with a manually pulled draft device, said beam being provided with a downturned rear end, a bar joined to the downturned end of said beam and projecting rearwardly, a plurality of lateral arms having vertical inner ends detachably secured to said bar, said arms being of unequal lengths and having downwardly directed outer ends and bolt holes adjacent the same, for the purpose set forth; and a rigid longitudinal handle secured to the frame and inclined forwardly therefrom.

4. In an implement, a frame comprising a beam having means at its front end for connection with a manually pulled draft device, said beam being provided with a downturned rear end adapted to be detachably connected with a weeder, plow share or other implement, and a bar joined to said downturned beam end and projecting rearwardly therefrom; means for detachably securing cultivating teeth to said bar, and a rigid longitudinal handle secured to the frame and inclined forwardly therefrom.

5. An implement comprising a beam having means at its front end for connection with a manually pulled draft device, said beam having a downturned rear end, a rigid implement-carrying bar extending rearwardly from said beam, a second bar rigidly joined to the rear end of said rearwardly extending bar, said second bar inclining forwardly to a point over said beam, a plate secured to one side of said second bar and overlapping one side of the beam, a second plate at the opposite side of said beam and second bar, a horizontal pivot connecting one end of said second plate with said second bar, the other end of said second plate having vertically spaced bolt holes, a clamping bolt receivable in any of said bolt holes and passing through said second bar, the upper edge of said second plate having a lateral flange formed at one end with spaced bolt holes, a longitudinal handle pivoted to the other end of said flange for horizontal adjustment, and a second clamping bolt passing through said handle and receivable in any of the spaced bolt holes of said flange.

6. In a manually operated implement, a longitudinal bar having a blade at its front end for cutting weeds below the surface of the ground, arms projecting in opposite directions from said bar and having cultivating teeth to work the earth from which the weeds have been cut by said blade, manually pulled draft means and means connecting said draft means with the front end of said bar, a longitudinally inclined handle, and means establishing a rigid connection between said handle and the rear end of said bar, the front end of said handle being provided with a transverse hand grip.

In testimony whereof I have hereunto affixed my signature.

WILLIAM S. U'REN.